US012694842B2

(12) United States Patent
Liu et al.

(10) Patent No.: US 12,694,842 B2
(45) Date of Patent: Jul. 28, 2026

(54) DISPLAY DEVICE

(71) Applicant: E Ink Holdings Inc., Hsinchu (TW)

(72) Inventors: Shu-Cheng Liu, Hsinchu (TW); Hsiao-Lung Cheng, Hsinchu (TW); Pei-Lin Tien, Hsinchu (TW); Chi-Mao Hung, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 19/007,560

(22) Filed: Jan. 2, 2025

(65) Prior Publication Data

US 2025/0218409 A1 Jul. 3, 2025

(30) Foreign Application Priority Data

Jan. 3, 2024 (TW) ................................ 113100315

(51) Int. Cl.
*G09G 3/34* (2006.01)

(52) U.S. Cl.
CPC ......... *G09G 3/344* (2013.01); *G09G 2340/16* (2013.01)

(58) Field of Classification Search
None
See application file for complete search history.

(56) References Cited

U.S. PATENT DOCUMENTS 7,916,137 B2 3/2011 Pearman et al.
8,681,164 B2 * 3/2014 Owen .................. H04N 19/423 345/535
9,886,916 B2 * 2/2018 Ko ......................... G09G 5/363
11,170,683 B2 11/2021 Han et al.
2008/0246702 A1 * 10/2008 Lee ...................... G09G 3/3233 345/77
2010/0007654 A1 1/2010 Ahn et al.
2010/0053182 A1 * 3/2010 Jeon ...................... G09G 5/399 345/557

(Continued)

FOREIGN PATENT DOCUMENTS

CN 111063295 A 4/2020
CN 112652262 A 4/2021
CN 113299248 A 8/2021

OTHER PUBLICATIONS

The office action of TW application No. 113100315 issued on Oct. 17, 2024.

*Primary Examiner* — Matthew Yeung
(74) *Attorney, Agent, or Firm* — CKC & Partners Co., LLC

(57) ABSTRACT

A display device, comprising a display panel, a signal processor and an image processor. The display panel comprises a driving circuit and multiple pixel circuits. The driving circuit is configured to provide multiple driving voltages to the pixel circuits. The signal processor is coupled to the display panel to receive a first image signal. The image processor is coupled to the signal processor, and is configured to receive the first image signal from the signal processor. The signal processor is further configured to output multiple first voltage data according to the first image signal. The signal processor is configured to receive the first voltage data from the image processor, and is configured to convert the first voltage data into a first driving signal. The first driving signal is configured to cause the driving circuit to provide the driving voltages to the pixel circuits.

13 Claims, 2 Drawing Sheets

(56) References Cited

U.S. PATENT DOCUMENTS

| | | | | |
|---|---|---|---|---|
| 2010/0109992 | A1* | 5/2010 | Sumi | G09G 3/3648 345/89 |
| 2010/0165222 | A1* | 7/2010 | Choi | H04N 13/341 345/87 |
| 2016/0267849 | A1* | 9/2016 | Chiu | G09G 3/344 |
| 2017/0092177 | A1* | 3/2017 | Kobayashi | G09G 3/2074 |
| 2020/0312256 | A1* | 10/2020 | Lin | G09G 3/3607 |
| 2021/0142738 | A1 | 5/2021 | Park | |
| 2022/0051631 | A1 | 2/2022 | Cheon et al. | |
| 2022/0351657 | A1 | 11/2022 | Yim et al. | |
| 2022/0383805 | A1 | 12/2022 | Lee et al. | |
| 2023/0178000 | A1* | 6/2023 | Goetz | G09G 5/363 345/204 |

* cited by examiner

DISPLAY DEVICE

CROSS-REFERENCE TO RELATED APPLICATION

This application claims priority to Taiwan Application Serial Number 113100315, filed Jan. 3, 2024, which is herein incorporated by reference in its entirety.

BACKGROUND

Technical Field

The present disclosure relates to an image display technology, and in particular to a display device.

Description of Related Art

In various consumer electronic products, "reflective display device" is widely used in display screens, such as electronic paper display device. The reflective display device uses incident light to illuminate a display medium layer to achieve a display effect, and therefore save power. However, with the improvement of imaging technology, the functions of reflective display devices are becoming more and more diversified, such as improving color or resolution, or integrating touch functions. As the functionality increases, the computing load on the electronic paper's processor also increases, causing the image output speed to slow down and affecting the display quality. Therefore, how to ensure the display quality of reflective display devices is a current research topic.

SUMMARY

One aspect of the present disclosure is a display device, comprising a display panel, a signal processor and an image processor. The display panel comprises a driving circuit and a plurality of pixel circuits. The driving circuit is configured to provide a plurality of driving voltages to the plurality of pixel circuits. The signal processor is coupled to the display panel to receive a first image signal. The image processor is coupled to the signal processor, and is configured to receive the first image signal from the signal processor. The signal processor is further configured to output a plurality of first voltage data according to the first image signal. The signal processor is configured to receive the plurality of first voltage data from the image processor, and is configured to convert the plurality of first voltage data into a first driving signal. The first driving signal is configured to cause the driving circuit to provide the plurality of driving voltages to the plurality of pixel circuits.

Another aspect of the present disclosure is a display device, comprising an electrophoretic display panel, a signal processing chip and an image processing chip. The electrophoretic display panel comprises a driving circuit and a plurality of pixel circuits. The driving circuit is configured to provide a plurality of driving voltages to the plurality of pixel circuits. The signal processing chip is coupled to the electrophoretic display panel, and is configured to receive a first image signal. The image processing chip is coupled to the signal processing chip through a physical transmission interface, and is configured to receive the first image signal from the signal processing chip. The image processing chip is further configured to output a plurality of first voltage data according to the first image signal. The signal processing chip is configured to receive the plurality of first voltage data from the image processing chip, and is configured to convert the plurality of first voltage data into a first driving signal. The first driving signal is configured to cause the driving circuit to provide the plurality of driving voltages to the plurality of pixel circuits.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
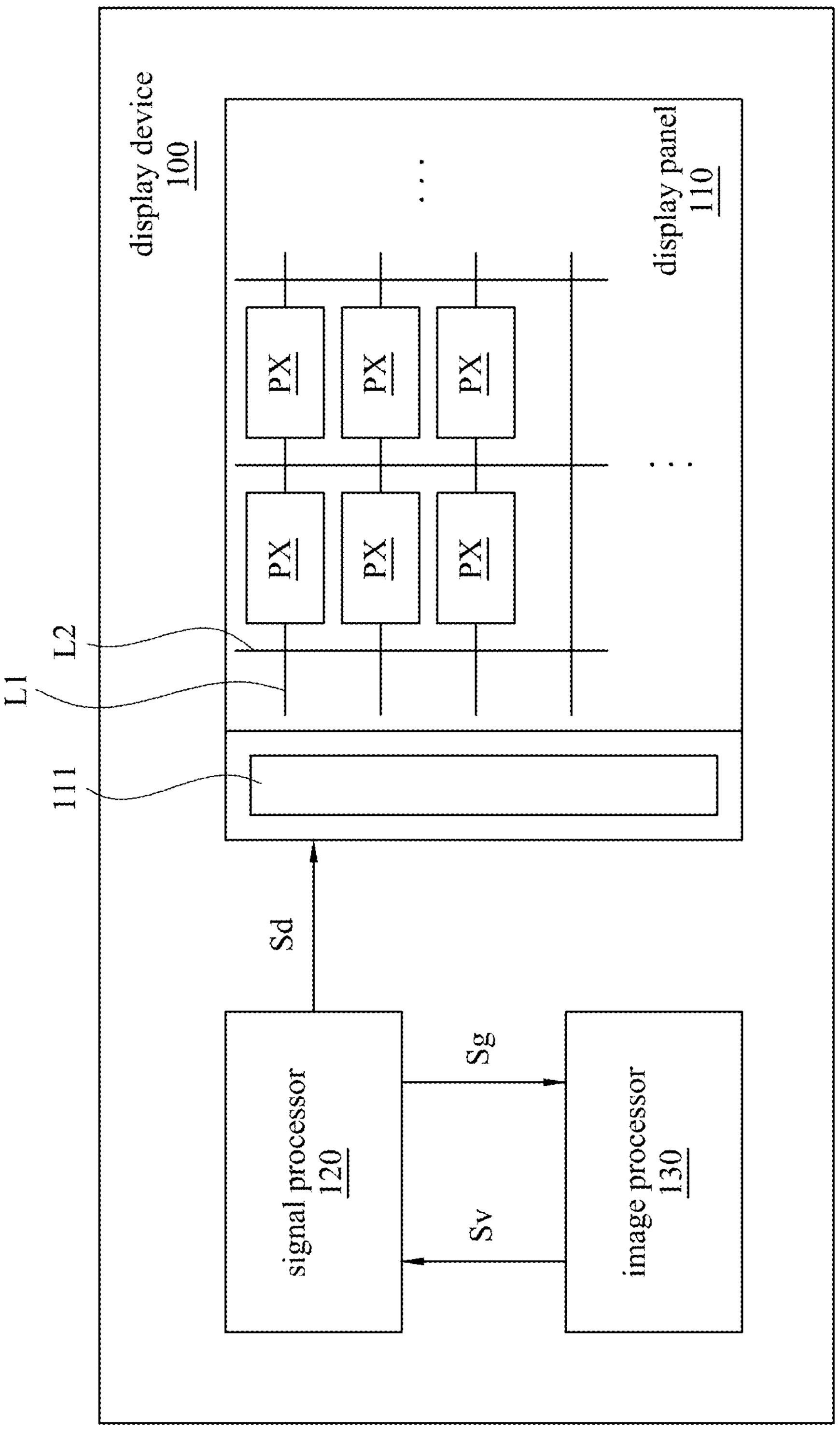
FIG. 1 is a schematic diagram of a display device in some embodiments of the present disclosure.

FIG. 1 is a schematic diagram of a display device 100 in some embodiments of the present disclosure. The display device 100 includes a display panel 110, a signal processor 120 and an image processor 130. The display device 100 is configured to drive multiple pixel circuits according to an image signal Sg, so as to display a image screen corresponding to the image signal.

In one embodiment, the image signal can be transmitted by a host device (not shown in figure, such as a computer, phone or server) to the display device 100. In other embodiments, the image signal Sg can be generated by the display device 100 (e.g., reading internal files to generate the image signal).

the display panel 110 includes a driving circuit 111 and multiple pixel circuits PX. The driving circuit 111 is configured to provide driving voltages to the pixel circuits PX, so as to control the brightness, grayscale or color displayed by the pixel circuits PX.

In one embodiment, the display panel 110 can be a reflective display device, such as an electrophoretic display device (electronic paper), but the present disclosure is not limited to this and can also be applied to other types of display devices. The display panel 110 includes a transistor array layer and an electronic ink layer. The transistor array layer (e.g., thin film transistor array, TFT array) forms an electric field according to control voltage to adjust positions of multiple electrophoretic particles in the electronic ink layer, thereby displaying different grayscales or different colors. The electronic ink layer includes a variety of electrophoretic particles (e.g., black or white), which are separately encapsulated in multiple microcapsules or microcups to form pixel units.

The signal processor 120 is coupled to the display panel 110, and is configured to receive the image signal. For ease of explanation, "image signal" described in the subsequent paragraphs is the image data received by the display device 100 in each update period. For example, "first image signal" corresponds to a first update period (e.g., a first frame), and is configured to record multiple pixel values that the pixel circuits PX requires to display/update during the first update period. "Second image signal" corresponds to a second update period (e.g., a second frame), and is configured to record multiple pixel values that the pixel circuits PX requires to display/update in the second update period.

The image processor 130 is coupled to the signal processor 120, and is configured to receive the image signal Sg from the signal processor 120. The image processor 130 outputs multiple voltage data Sv according to the received image signal Sg. The image processor 130 is configured to transmit voltage codes (the voltage data Sv) to the signal processor 120. "Voltage data" corresponds to driving voltages required by the pixel circuits PX. For example, the image processor 130 finds multiple first voltage data according to the first image signal, and these first voltage data can be the driving voltages required by the pixel circuits PX during the first update period, or these first voltage data can be voltage codes (e.g., 8-bit or 16-bit code composed of binary bits) corresponding to driving voltages. The driving circuit 111 can identify these voltage codes, so as to provide the correct driving voltages to each pixel circuit PX.

Specifically, the image processor 130 stores a data lookup table TB, the data lookup table TB restores the voltage data required by the pixel circuits PX to display different pixel values. The image processor 130 is configured to find the required voltage data Sv from the data lookup table TB.

In one embodiment, after the signal processor 120 receives the voltage codes, the signal processor 120 converts the voltage codes into a driving signal Sd according to an update signal of the pixel circuits PX. The above driving signal Sd is configured to cause the driving circuit 111 provide the driving voltages to the pixel circuits PX. The above update signal is/records a scanning sequence in which the driving circuit 111 drives multiple scanning lines in the display panel 110. As shown in FIG. 1, the display panel 110 transmits the driving voltage to the corresponding pixel circuit PX through multiple data lines L1 and multiple scanning lines L2, and the scanning sequence can be recorded in the signal processor 120 in advance.

In one embodiment, the signal processor 120 and the image processor 130 are coupled through a physical transmission interface, such as USB (Universal Serial Bus), PCI-E (Peripheral Component Interconnect Express) or other two-way transmission interfaces. The image processor 130 can be used as a plug-in/external processor to assist in processing tasks of the signal processor 120 to reduce the computing load of the signal processor 120.

In one embodiment, the signal processor 120 and the image processor 130 can be respectively packaged as a SoC (System on a Chip), and the display device 100 can be an embedded system. In other words, the signal processor 120 and the image processor 130 can be respectively be an independent processing chip (e.g., a signal processing chip, a image processing chip), and are also packaged in the display device 100. The signal processor 120 can be arranged in the display panel 110, and the image processor 130 can be arranged in a system side and not in the display panel 110.

The present disclosure uses two different processors to perform the functions of "generating the voltage data Sv" and "generating the driving signal Sd" respectively. Therefore, the computing load of the signal processor 120 will be reduced. In addition, in one embodiment, the image processor 130 is arranged in the display device 100 in the form of system on a chip (SoC), so the image processor 130 can be conveniently applied to the display device 100 of different types or functions.

Compared with the method of "upgrading the hardware and driving the display panel with a single processor", the present disclosure requires lower development costs by using the external image processor 130. On the other hand, compared with the method of "designing specific software to improve the driving speed of the display panel", the present disclosure does not require a lot of development time, and does not require changing the original internal system operation of the signal processor 120 by using the external image processor 130. Therefore, the display device 100 of the present disclosure will be able to achieve functions such as distributed computing load, control of hardware costs, no need for development time, and can be easily applied to different types of display panels.

Figure 2:
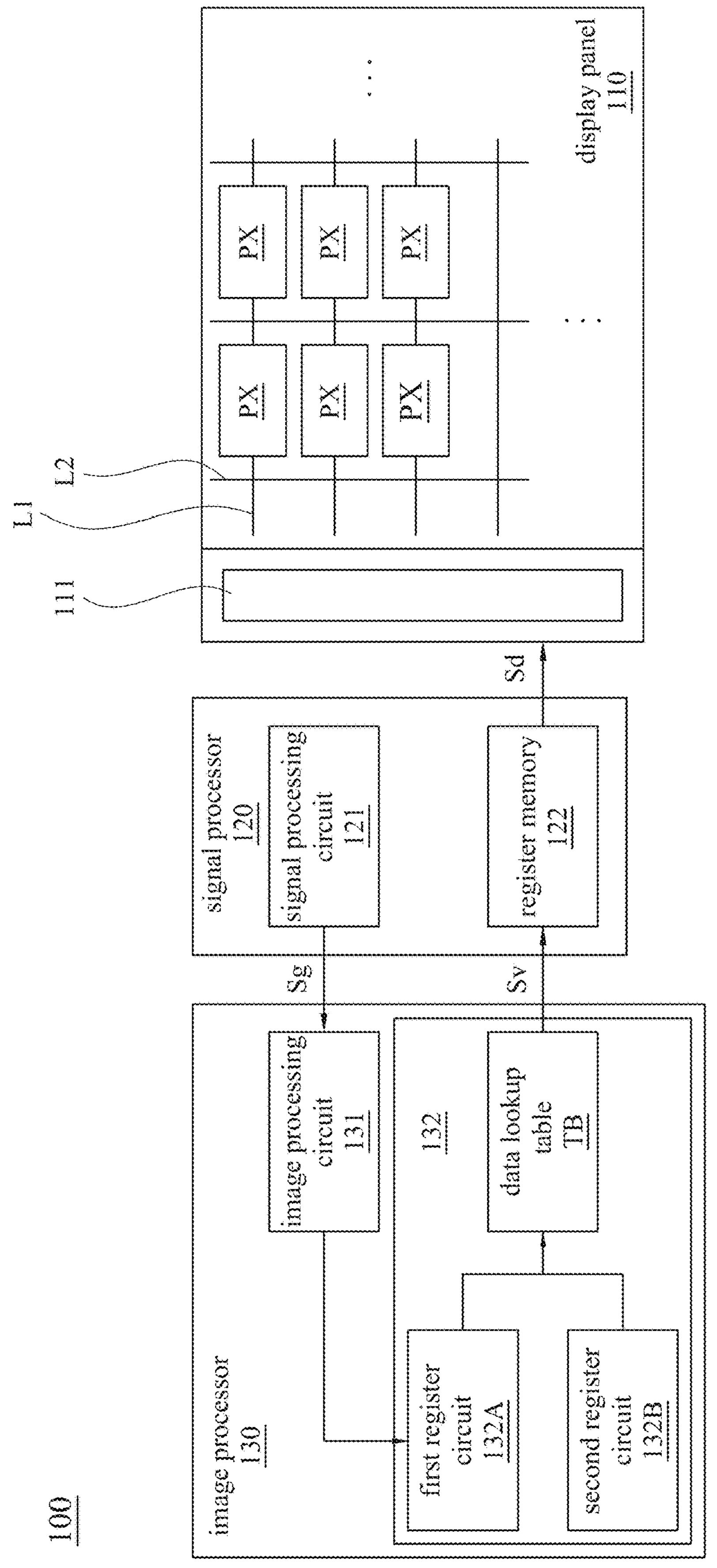
FIG. 2 is a schematic diagram of a display device in some embodiments of the present disclosure.

FIG. 2 is a detail schematic diagram of the display device in some embodiments of the present disclosure. The signal processor 120 includes a signal processing circuit 121, and is configured to transmit the received image signal Sg to the image processor 130.

In one embodiment, the image processor 130 includes an image processing circuit 131 and a storage circuit 132. The image processing circuit 131 is coupled to the signal processor 120 through the physical transmission interface, so as to receive the image signal Sg. The storage circuit 132 is coupled to the image processing circuit 131, and is configured to store the data lookup table TB. The image processing circuit 131 is configured to find the corresponding voltage data Sv from the data lookup table TB according to the image signal Sg. As mentioned above, the voltage data Sv can be the driving voltages required by the pixel circuits PX, or can be voltage codes.

In addition, the storage circuit 132 further includes a first register circuit 132A and a second register circuit 132B. The first register circuit 132A and the second register circuit 132B are configured to respectively image signals Sg corresponding to different update periods. The image processing circuit 131 is configured to compare "the image signal of the current period" and "the image signal of the previous period", so as to generate a comparison result. Then the image processing circuit 131 finds the corresponding voltage data Sv from the data lookup table TB according to the comparison result.

For example, "the image signal of the current period" is a first image signal corresponding to the first update period, and "the image signal of the previous period" is a second image signal corresponding to the second update period, the image processor 130 receives the second image signal first, and receives the first image signal after processing the second image signal. The image processing circuit 131 generate the driving voltages or the voltage codes that currently (e.g., during a first update period) needs to be provided to the pixel circuits PX according to a difference between the first image signal and the second image signal.

As mentioned above, after the image processing circuit 131 transmits the generated voltage data Sv to the signal processor 120, the image processing circuit 131 deletes the second image signal in the second register circuit 132B, and change the first image signal to store to the second register circuit 132B. Then, the image processing circuit 131 deletes the first image signal in the first register circuit 132A. At this time, the image processing circuit 131 will receive the next image signal for subsequent processing.

The present disclosure uses the image processor 130 converting the image signal Sg into the voltage data Sv, so as to reduce the computing load of the signal processor 120. In addition, in some embodiments, the signal processor 120 can transmit the image signal to the image processor 130 several update periods in advance, so as to cause the image processor 130 process the image signal Sg of the update period to the voltage data Sv. Specifically, in one embodiment, the signal processor 120 includes a register memory 122. The register memory 122 stores multiple voltage data Sv provided by the image processor 130 corresponding to multiple update periods. After receiving the voltage data Sv transmitted by the image processor 130, the signal processor 120 does not need to immediately generate the driving signal Sd to the display panel 110 according to the voltage data Sv. Relatively, the signal processor 120 is configured to sequentially converts "the voltage data corresponding to the current update period" into the driving signal Sd during each update period, and outputs the driving signal Sd to the display panel 110 (i.e., sequentially converting multiple voltage data into multiple driving signals during multiple update periods).

For example, the update periods of the display panel 110 are "F1, F2, F3, F4, F5 . . . ", during the update period "F1", the signal processor 120 provides the image signal corresponding to the update periods "F2-F5" to the image processor 130 in advance, so that the image processor 130 generates voltage data corresponding to the image signal of each update period "F2-F5" in advance. After the signal processor 120 receives voltage data corresponding to the image signal of each update period "F2-F5", during the update period "F2", the signal processor 120 converts a voltage data corresponding to the update period "F2" into a driving signal, and transmits the driving signal to the display panel 110. Similarly, during the update period "F3", the signal processor 120 converts a voltage data corresponding to a update period "F3" into the driving signal, and transmits the driving signal to the display panel 110.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A display device, comprising:

a display panel comprising a driving circuit and a plurality of pixel circuits, wherein the driving circuit is configured to provide a plurality of driving voltages to the plurality of pixel circuits;

a signal processor coupled to the display panel to receive a first image signal; and an image processor coupled to the signal processor, configured to receive the first image signal from the signal processor, and configured to output a plurality of first voltage data according to the first image signal;

wherein the signal processor is configured to receive the plurality of first voltage data from the image processor, and is configured to convert the plurality of first voltage data into a first driving signal;

wherein the first driving signal is configured to cause the driving circuit to provide the plurality of driving voltages to the plurality of pixel circuits.

2. The display device of claim 1, wherein the image processor comprises a data lookup table, and is configured to find the plurality of first voltage data from the data lookup table according to the first image signal, and the plurality of first voltage data corresponds to the plurality of driving voltages required by the plurality of pixel circuits during a first update period.

3. The display device of claim 1, wherein the signal processor is configured to convert the plurality of first voltage data into the first driving signal according to an update signal, and the update signal is a scanning sequence in which the driving circuit drives a plurality of scanning lines in the display panel.

4. The display device of claim 2, wherein the first image signal corresponds to the first update period, a second update period before the first update period, and the image processor comprises:

a first register circuit configured to the first image signal; and a second register circuit configured to a second image signal corresponding to the second update period, wherein the image processor is configured to compare a difference between the first image signal and the second image signal to generate a comparison result;

wherein the image processor is configured to find the plurality of first voltage data from the data lookup table according to the comparison result.

5. The display device of claim 4, wherein after the image processor transmits the plurality of first voltage data to the signal processor, the image processor is configured to store the first image signal in the second register circuit, and is configured to delete the first image signal in the first register circuit.

6. The display device of claim 2, wherein the signal processor comprises a register memory, the register memory is configured to store a plurality of voltage data corresponding to a plurality of update periods, and the plurality of voltage data comprises the plurality of first voltage data corresponding to the first update period; and wherein the signal processor is configured to sequentially converts the plurality of voltage data into a plurality of driving signals during the plurality of update periods.

7. The display device of claim 1, wherein the signal processor and the image processor are coupled through a physical transmission interface, and the image processor is packaged as a system on a chip.

8. The display device of claim 1, wherein the plurality of first voltage data is a plurality of voltage codes, and the driving circuit is configured to identify the plurality of voltage codes to provide the plurality of driving voltages to the plurality of pixel circuits.

9. A display device, comprising:

an electrophoretic display panel comprising a driving circuit and a plurality of pixel circuits, wherein the driving circuit is configured to provide a plurality of driving voltages to the plurality of pixel circuits;

a signal processing chip coupled to the electrophoretic display panel, and configured to receive a first image signal; and an image processing chip coupled to the signal processing chip through a physical transmission interface, configured to receive the first image signal from the signal processing chip, and configured to output a plurality of first voltage data according to the first image signal;

wherein the signal processing chip is configured to receive the plurality of first voltage data from the image processing chip, and is configured to convert the plurality of first voltage data into a first driving signal;

wherein the first driving signal is configured to cause the driving circuit to provide the plurality of driving voltages to the plurality of pixel circuits.

10. The display device of claim 9, wherein the image processing chip stores a data lookup table, and the image processing chip is configured to find the plurality of first voltage data from the data lookup table according to the first image signal.

11. The display device of claim 10, wherein the first image signal corresponds to a first update period, a second update period before the first update period, and the image processing chip comprises:

a first register circuit configured to the first image signal; and a second register circuit configured to a second image signal corresponding to the second update period, wherein the image processing chip is configured to compare a difference between the first image signal and the second image signal to generate a comparison result;

wherein the image processing chip is configured to find the plurality of first voltage data from the data lookup table according to the comparison result, and the plurality of first voltage data corresponds to the plurality of driving voltages required by the plurality of pixel circuits during the first update period.

12. The display device of claim 11, wherein after the image processing chip transmits the plurality of first voltage data to the signal processing chip, the image processing chip is configured to store the first image signal in the second register circuit, and is configured to delete the first image signal in the first register circuit.

13. The display device of claim 9, wherein the signal processing chip comprises a register memory, the register memory is configured to store a plurality of voltage data corresponding to a plurality of update periods, and the plurality of voltage data comprises the plurality of first voltage data; and wherein the signal processing chip is configured to sequentially converts the plurality of voltage data into a plurality of driving signals during the plurality of update periods.

* * * * *